No. 834,456. PATENTED OCT. 30, 1906.
H. A. CLAPP.
POWER CARRYING GRADING MACHINE.
APPLICATION FILED SEPT. 11, 1905.
2 SHEETS—SHEET 1.
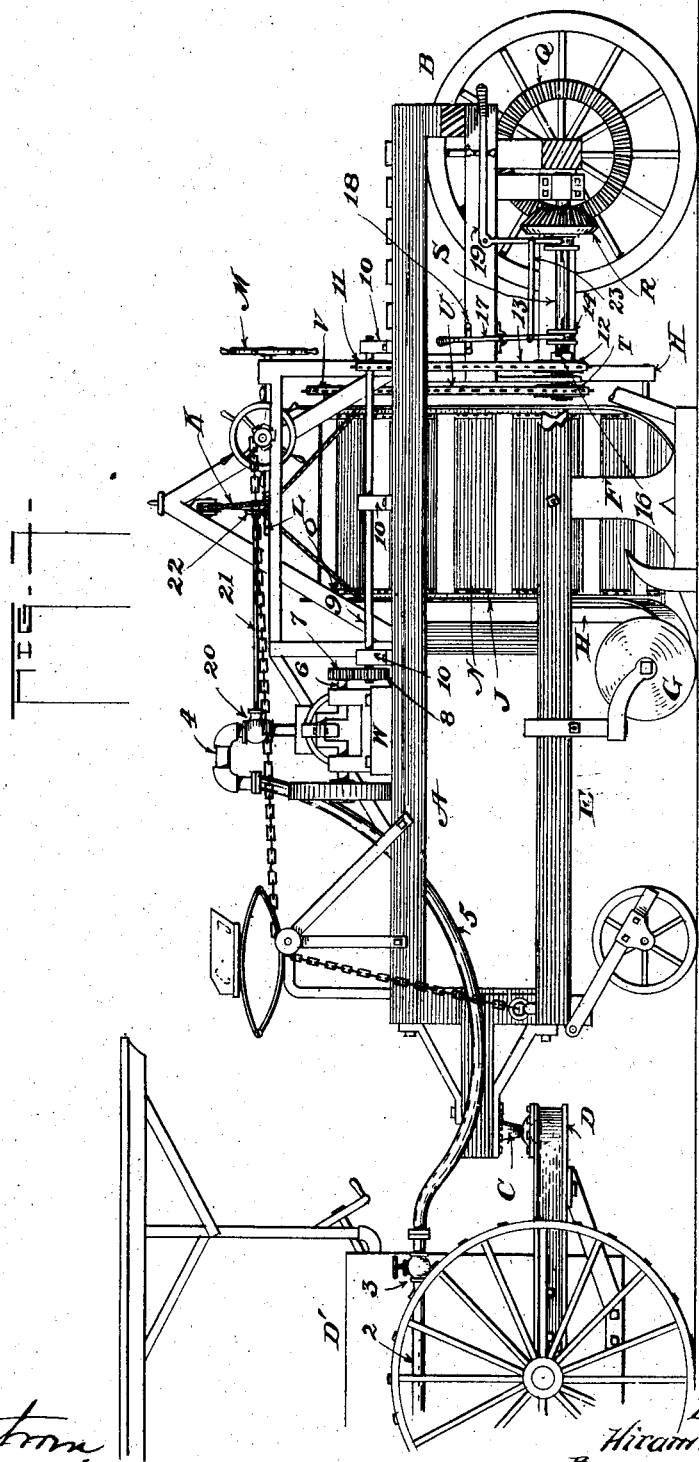

No. 834,456. PATENTED OCT. 30, 1906.
H. A. CLAPP.
POWER CARRYING GRADING MACHINE.
APPLICATION FILED SEPT. 11, 1905.
2 SHEETS—SHEET 2.
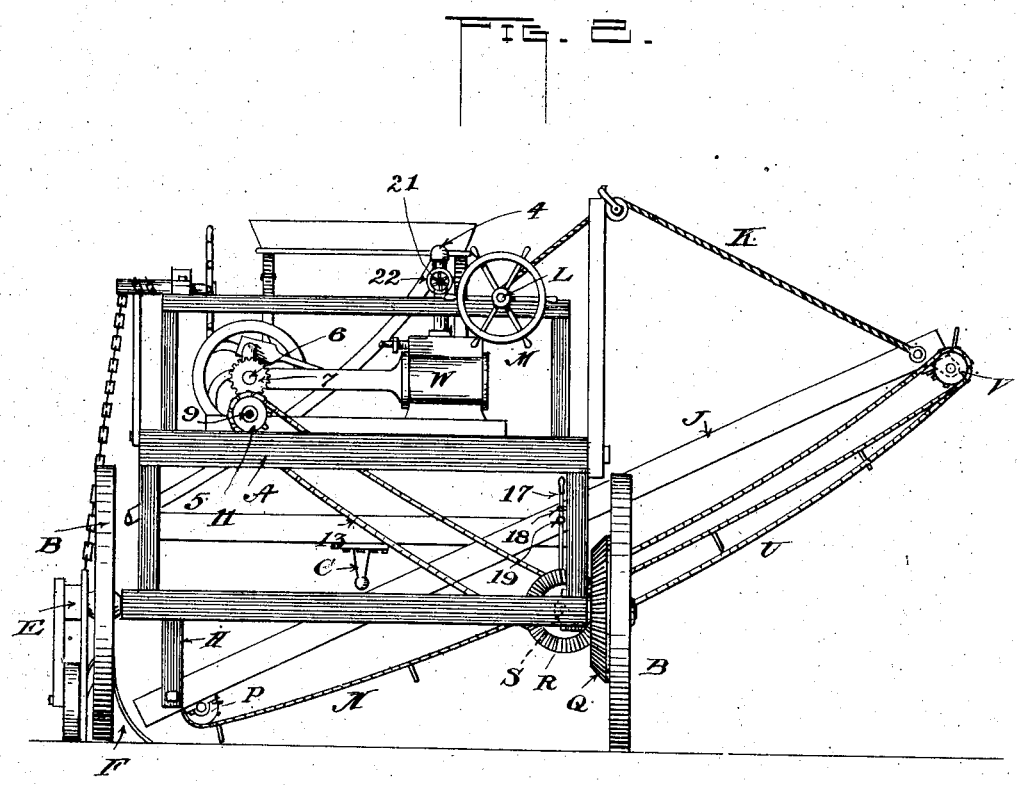
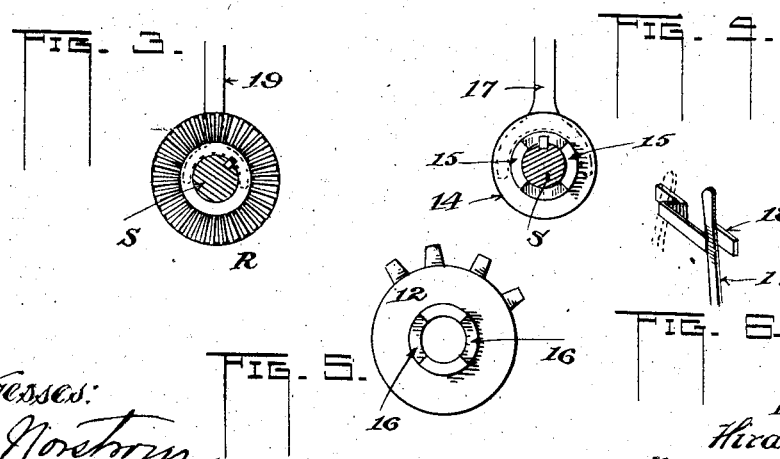

UNITED STATES PATENT OFFICE.

HIRAM ALLAN CLAPP, OF CHICAGO, ILLINOIS.

POWER-CARRYING GRADING-MACHINE.

No. 834,456.        Specification of Letters Patent.        Patented Oct. 30, 1906.

Application filed September 11, 1905. Serial No. 277,826.

*To all whom it may concern:*

Be it known that I, HIRAM ALLAN CLAPP, a citizen of the United States, residing at Chicago, in the county of Cook and State of Illinois, have invented certain new and useful Improvements in Power-Carrying Grading-Machines; and I do hereby declare that the following is a full, clear, and exact description of the invention, which will enable others skilled in the art to which it appertains to make and use the same.

This invention has reference to improvements in that class of implements known as "elevating-graders."

The invention has for one of its objects to provide an elevating-grader having self-carried power for operating its elevating mechanism.

Another object is to provide a convertible elevating-grader or one whose elevating mechanism may be operated by a self-carried power or operated from the usual ground-wheels.

A further object of the invention is to provide an elevating-grader having a positively-driven elevating mechanism or one not dependent upon the ground-wheels for the driving power.

Another object is to mount a steam-engine upon an elevating-grader for use in driving the elevating mechanism and providing a steam connection between the said steam-engine and the source of steam-supply, such connection being capable of accommodating itself to the various movements of the grader and the said steam source.

Still another object of the invention is to combine a traction-engine and elevating-grader, provide a steam-engine for the latter, and detachable steam connection between the traction-engine and steam-engine for the purposes above outlined.

In the appended drawings, which form a part of this application, Figure 1 is a side elevation of my improved grader, shown in connection with a traction-engine and on which is mounted a steam-engine. Fig. 2 is a view of the rear end of a grader, showing a steam-engine mounted thereon. Fig. 3 is a face view of a beveled gear-wheel, showing a shaft to which it is keyed and a shifting-lever for shifting said gear along its shaft. Fig. 4 is an end view of a clutch member. Fig. 5 is a side view of a sprocket-wheel with which the clutch member shown in Fig. 4 is designed to engage. Fig. 6 is a perspective view of a shifting-lever, showing means for holding it at each limit of its travel.

The grading-machine may be of any approved form of construction, since I lay no claim to the machine itself. In the figures the frame of a grader is represented by the letter A, and B represents the rear carrying-wheels therefor. The forward end is provided with a pivotal support C to rest upon the rear portion D of a traction-engine D'; but this has been fully described in my former application, filed on the 26th day of August, 1905, Serial No. 275,936, and will need no further description.

At E is a beam which serves to carry the plow member F and rolling-cutter G, as in other machines of this class. Suitably suspended from the machine-frame—as, for instance, by hangers H—is an elevator J for the dirt turned by the plow, the upper end of such elevator having means for adjusting it to a desired elevation—as, for instance, by means of a cable K and winding-drum L, operated by a hand-wheel M.

Within the elevator is a chain-drag N, carried by sprocket-wheels O and P above and below, respectively. This drag N has usually been driven from the ground-wheels B, a beveled gear Q (shown in the drawings) being employed to drive a beveled pinion R, carried on a shaft S, the latter also having a sprocket-wheel T for imparting motion to the upper sprocket V by and through a sprocket-chain U. As has been stated, this method or its equivalent has been employed for driving the elevator; but in loose dirt or mud the wheels slip so that power from this source is possible only under the most favorable conditions.

It is my purpose therefore to provide a source of power that is fully up to the demands at all times, is always ready, and, furthermore, when necessary will operate to drive the elevator even when the grader is not moving. Upon the top of the grader or at any suitable place, in fact, is located a steam-engine, (indicated by W,) which receives steam from the traction-engine D' through a pipe 2 on the latter, said pipe having a cut-off valve 3 for shutting off the steam at that point. Connecting the pipe 2 with a pipe 4 of the engine W is a flexible steam connection 5, which may be a rubber hose or other suitable material that will stand the pressure of steam. Evidently, however, other forms of connection can be employed, if desired, although the flexible one is perhaps preferable, for the reason that it can be more readily attached and detached and put out of the way, it being necessary also to have such a connection as will have steam-tight joints while accommodating itself to the varying positions of the traction-engine and the grader. On the crank-shaft 6 of the engine W is a gear-wheel 7, meshing with a similar gear 8 on the end of a shaft 9, having bearings at 10 on the grader-frame. Said shaft 9 carries a sprocket-wheel 11, connected with a sprocket-wheel 12 on the shaft S, before described by means of a chain 13. The sprocket-wheel last mentioned is loose on its shaft, so that the engine W can be operated without driving the said shaft S, or the grader can be operated by its own power through the ground-wheels when desired. Upon the shaft is a shifting clutch 14 having projecting members 15 thereon for entering recesses 16 in the hub of the sprocket-wheel. The clutch is keyed to the shaft and must consequently turn the same when the sprocket and clutch are in engagement. A lever 17, pivoted to the frame of the machine, serves to shift the clutch, and a U-shaped member, Fig. 6, is secured also to the frame and holds the lever by friction in either of its two positions by throwing it into the notches therein.

The gear-wheel R before mentioned, which is carried on the shaft S, is shiftable by means of a lever 19, similar in all respects to the lever 17, the hub of the gear being properly formed to receive said lever, said gear being suitably keyed to its shaft, Fig. 3, for driving the latter. It will now be understood that by throwing the gears R and Q out of engagement and connecting the sprocket 12 and its clutch 14 the engine W is free to drive the elevator without interference from the gear R. On the other hand, by reversing the positions of said connections the engine and its driving connections with the shaft will be entirely free of the latter, so that the ground-wheel can furnish the power as heretofore. I provide such a construction in order that a grading-machine will be adaptable for connection with a traction-engine or drawn by means of horses.

In the pipe 4 of the engine W is placed a valve 20, having a stem 21 extending toward the operator's platform, a hand-wheel 22 serving to operate said valve, and in this way the engine can be readily and instantly stopped at any time. Connected with a traction-engine in the manner shown and described in my former application referred to or even when drawn on all of its wheels behind the engine steam is easily available, so that a steam-engine upon the grader is of great value, because thoroughly reliable and having practically unlimited power for the work in hand.

Other self-carrying power may be placed on the grader it is true, but the steam-engine is to be preferred for the reasons stated. Any other form of connection can be used between the engine W and the elevator and any style of clutch mechanism can be employed without departing from the spirit and intent of the invention. As a matter of fact, a motor of any kind may be employed so long as the proper power can be conducted to it—such, for instance, as air or electricity. It is understood that the grader is convertible from its own carrying or ground wheels to the engine by simply removing the forward wheels, the pivotal means at C providing the means for connection with the engine or said front wheels. The levers 17 and 19 described may be connected, as by the bar 23, so that in throwing one of them—as, for instance, the lever 19—to remove the gear R from gear Q to remove the power connection with the ground-wheel B the lever 17 will be operated to connect the engine W with the elevator, and vice versa.

I claim—

1. The combination of a traction-engine, a grading-machine in the rear of, separate from, and drawn by said engine, an elevator for the grader, a steam-engine carried on the grader for driving the elevator and a steam connection between the steam-engine and the traction-engine for imparting driving movement to the former.

2. The combination of a traction-engine, a grading-machine in the rear of and drawn by said engine, an elevator for the grader for the purposes set forth, a power-producing device on the grader having connection with said elevator for driving it and a detachable yielding tubular connection between the traction-engine and the power-producing device for conveying driving pressure therethrough from the former to the latter.

3. The combination of a traction-engine, a grading-machine in the rear of, drawn by, and supported at its forward end on said engine, an elevator for the grader, an independent power device carried by the said grader, and a yielding tubular connection between the said power device and the traction-engine for conveying the driving pressure therethrough to said power device such connection adapted to conform to the various changes of position of the traction-engine and the grader relatively.

4. A grading-machine comprising the wheeled frame, a plow carried thereon, an elevator for receiving dirt from the plow, power means between the ground-wheels and the elevator for driving the latter, means for throwing the same into and out of gear, separate power means carried on the machine, driving connection between the said power means and the elevator, and means for throwing the same in and out of gear for the purposes set forth.

5. A grader comprising its carrying-frame, a plow carried on the frame, an elevator for receiving dirt from the plow, driving means on the carrying-wheels of the grader, connections between such means and the elevator for driving the latter, a power device carried on the machine, connections between it and the elevator for driving the latter from said power device, means for disconnecting the driving means on the ground-wheels from the elevator and means for disconnecting the said power device from said elevator all for the purposes set forth and described.

6. A grading-machine comprising a wheeled frame, a plow carried thereon, an elevator for receiving dirt from the plow, power means between the ground-wheels and the elevator for driving the latter, means for throwing the same in and out of gear, separate power means carried on the machine, driving connection between the said power means and the elevator, and means for throwing the same into gear to drive the elevator when the first said power means is disconnected and vice versa.

7. The combination of a traction-engine, a grading-machine in the rear and drawn by said engine, the forward portion of said grader having support on the engine, an elevator on the grader for the purposes set forth, a power-motor also on the grader for driving the elevator, means for connecting and disconnecting the motor and elevator, and pressure-conveying means between the traction-engine and motor.

8. The combination of a traction-engine, an elevating-grader drawn by the engine, ground-wheels for the grader, power connections between the wheels and elevator for driving the latter from the said wheels, means for connecting and disconnecting the power means and the elevator, a power-motor carried on the grader, driving connection between the motor and elevator, means for releasing the connection from the elevator for the purposes described, and pressure-conveying means between the engine and power-motor, said elevator being driven from the ground-wheels or the motor at the times and for the purposes described.

9. An elevating-grader convertible from a power-drawn to a horse-drawn implement, comprising a frame, ground-wheels therefor, driving connection on the ground-wheels, an elevator driven thereby, a power-motor carried on the frame, driving connection between the motor and elevator, connection for conveying pressure from a source of power, means for connecting one power mechanism with the elevator and disconnecting the other for the purposes indicated, and other means for detachably mounting the forward end of the grader on front carrying-wheels or traction-engine.

10. A grading-machine comprising a wheeled frame, a plow carried thereon, an elevator for receiving dirt from the plow, power means between the ground-wheels and the elevator for driving the latter, separate power means carried on the machine, driving connection between the power means and the elevator and means for simultaneously changing the power from one to the other of the driving sources.

11. The combination with a grading-machine comprising a frame wheeled at its rear end, of a traction-engine to which the forward end of the grader is connected and on which it is supported, a plow carried on the grader, an elevator, driving connection between the wheels of the grader and said elevator, a power device carried on the grader for driving the elevator, a flexible steam connection between the boiler of the traction-engine and the power device and means for disconnecting the driving connection between the wheels and the elevator and the said power device and the elevator.

12. The combination with a grading-machine comprising a frame wheeled at its rear end, of a traction-engine to which the forward end of the grader is connected and on which it is supported, a plow carried on the grader, an elevator, driving connection between the wheels of the grader and said elevator, a power device carried on the grader for driving the elevator, a flexible steam connection between the boiler of the traction-engine and the power device, and means for simultaneously disconnecting one of the driving connections of the elevator and throwing the other into operation.

13. In a grading-machine convertible from a horse-drawn to an engine-drawn, comprising a wheeled frame, a plow, an elevator, driving connections between the wheels and elevator, means for disconnecting the same, a separate power means carried on the grader, driving connection between said power means and the elevator and means for disconnecting the power means and elevator and connecting the wheel and the elevator when the grader is to be drawn by horses, such operation being reversed when the grader is drawn by the traction-engine, and a flexible connection between the latter and the power means for the purposes set forth.

14. In a grading apparatus the combination of the traction-engine, a grading-machine attached to and drawn by said engine, said machine supported at its forward end on the engine, and on its own wheels at the rear, a plow member and elevator for the purposes described, a power device carried by the grader independent of mechanical driving connection with the engine, and means for conveying pressure from the engine to the power device for the purposes described.

15. The combination of a steam traction-engine, a grading-machine connected thereto and drawn thereby, an elevator for the said grading-machine, a power device for driving the elevator self-carried by the grader, the said power device being independent of mechanical driving connection with the engine and a conduit for conveying pressure from the engine to such power device.

In testimony whereof I affix my signature in presence of two witnesses.

HIRAM ALLAN CLAPP.

Witnesses:
FRANK L. SALISBURY,
EDWARD J. HERDLICKA.